United States Patent [19]
Kondo et al.

[11] Patent Number: 5,781,238
[45] Date of Patent: Jul. 14, 1998

[54] INFORMATION SIGNAL ENCODING APPARATUS, ENCODING METHOD THEREOF, INFORMATION SIGNAL DECODING METHOD, AND INFORMATION SIGNAL RECORD MEDIUM THEREOF

[75] Inventors: Tetsujiro Kondo; Yasuhiro Fujimori; Kenji Takahashi; Kunio Kawaguchi, all of Kanagawa, Japan

[73] Assignee: Sony Corporation, Tokyo, Japan

[21] Appl. No.: 687,085

[22] Filed: Jul. 23, 1996

[30] Foreign Application Priority Data

Jul. 28, 1995 [JP] Japan ................................ 7-212685

[51] Int. Cl.⁶ .................................................. H04N 7/32
[52] U.S. Cl. .......................... 348/405; 348/408; 348/421
[58] Field of Search ........................... 348/405, 419, 348/421, 420, 415, 409, 401, 400, 390, 384, 408; 382/251, 238, 236, 232; 386/109, 111, 33; H04N 7/137

[56] References Cited

U.S. PATENT DOCUMENTS

| | | | |
|---|---|---|---|
| 5,070,402 | 12/1991 | Ishii et al. | 348/421 |
| 5,706,009 | 1/1998 | Kondo et al. | 341/200 |

*Primary Examiner*—Bryan Tung
*Attorney, Agent, or Firm*—Frommer Lawrence & Haug LLP; William S. Frommer

[57] ABSTRACT

Difference signals generated in the prediction encoding process for an input digital information signal are block segmented. The maximum value and minimum value of each block are detected. In addition, a quantizing step $\Delta$ is calculated. An offset detecting circuit detects a zero position flag ZR and an offset off. The zero position flag ZR represents a quantized code that includes 0. The offset off represents the deviation between value 0 of difference signals and value 0 of restored representative values. A class category adaptive predicting circuit predicts ZR and $\Delta$. These values are not transmitted in other than exception process. With predicted values ZR and $\Delta$, difference signals corrected with the offset off are quantized by a quantizing circuit.

8 Claims, 13 Drawing Sheets

Fig. 3A
| a | b | c | d | | |
|---|---|---|---|---|---|
| e | f | A | B | C | D |
| g | h | E | F | G | H |
|   |   | I | J | K | L |
|   |   | M | N | O | P |
Fig. 3B
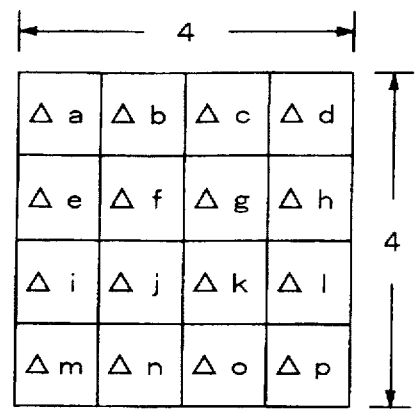
Fig. 5
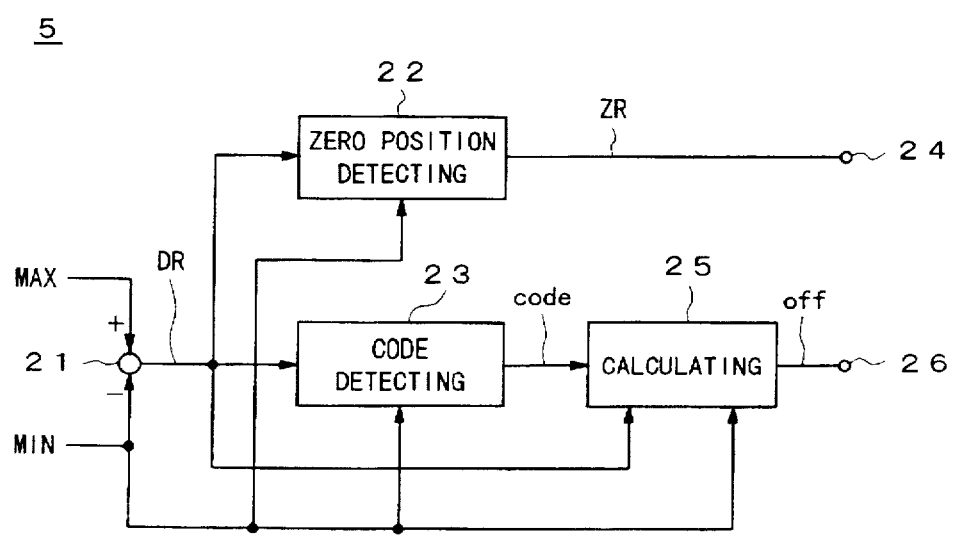

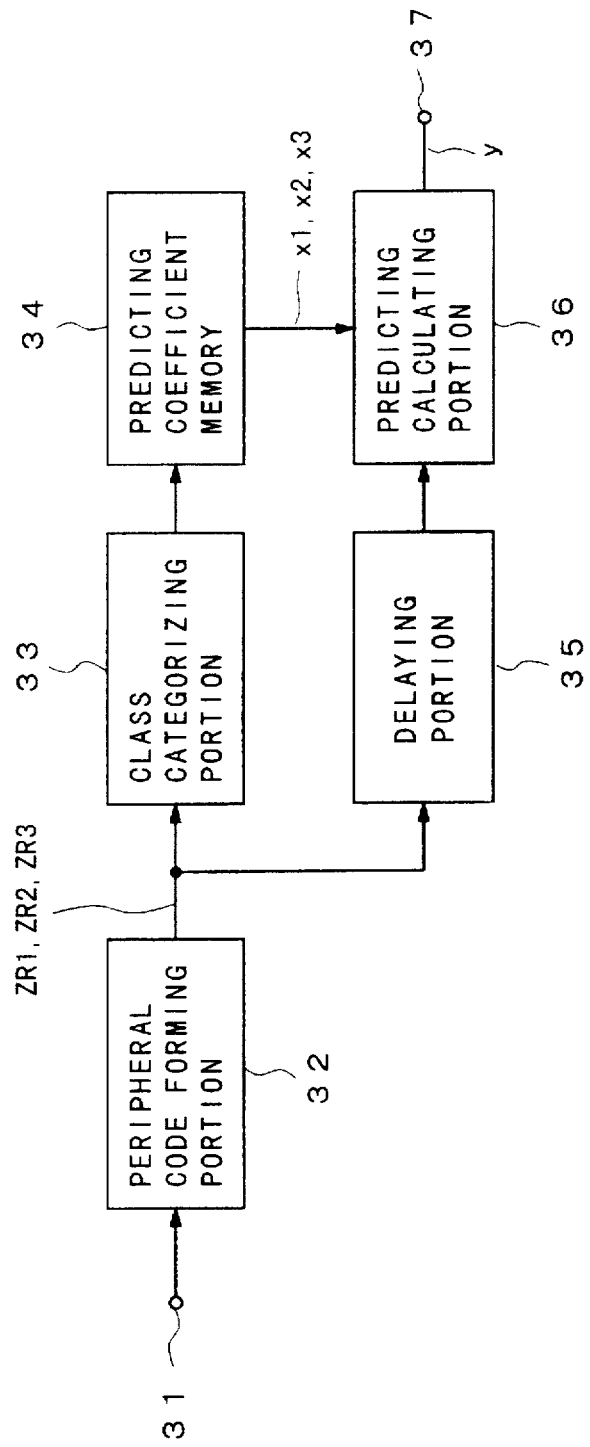

Fig. 12
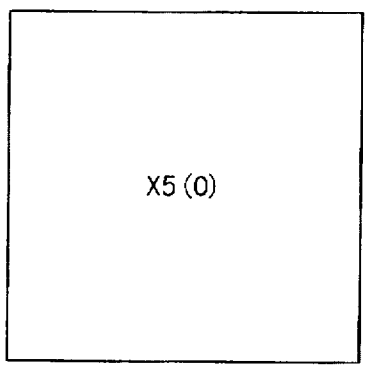
FIFTH HIERARCHICAL LEVEL,
BLOCK SIZE (1/16 × 1/16)
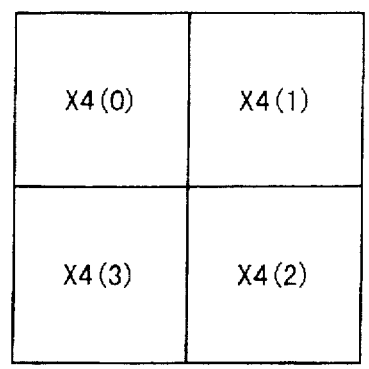
FOURTH HIERARCHICAL LEVEL,
BLOCK SIZE (1/8 × 1/8)
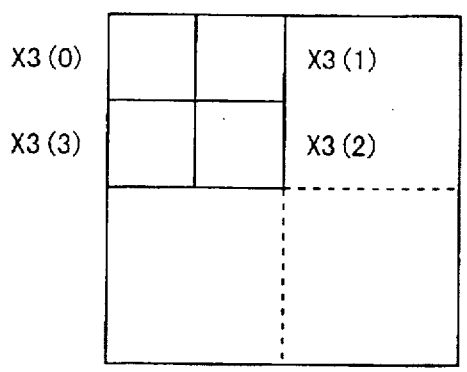
THIRD HIERARCHICAL LEVEL,
BLOCK SIZE (1/4 × 1/4)
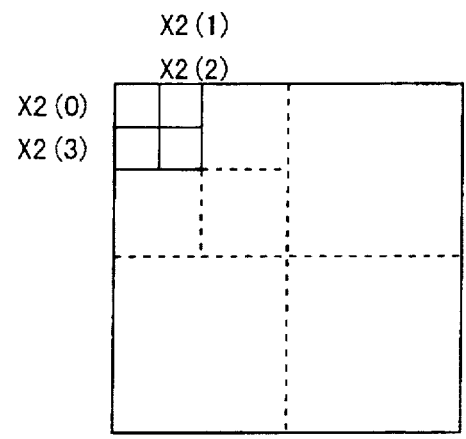
SECOND HIERARCHICAL LEVEL,
BLOCK SIZE (1/2 × 1/2)
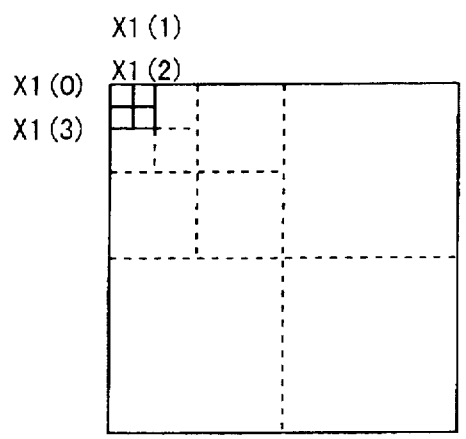
FIRST HIERARCHICAL LEVEL,
BLOCK SIZE (1 × 1)

INFORMATION SIGNAL ENCODING APPARATUS, ENCODING METHOD THEREOF, INFORMATION SIGNAL DECODING METHOD, AND INFORMATION SIGNAL RECORD MEDIUM THEREOF

BACKGROUND OF THE INVENTION

1. Field of the Invention

The present invention relates to an information signal encoding apparatus for decreasing the amount of generated data of digital information signals such as a digital audio signal and a digital picture signal, an encoding method thereof, and a decoding method thereof. In particular, the present invention relates to such apparatus and method for quantizing digital information signals and transmitting additional information along with quantized information.

2. Description of Related Art

A variety of prediction encoding methods for decreasing the amount of transmission information such as a digital audio signal and a digital picture signal are known. As an example, in the one-dimensional DPCM method, the difference between an input sample value and a predicted value is formed in the temporal direction. In the two-dimensional DPCM method, the difference between an input sample value and a predicted value is formed in the spatial direction. Since the digital information signal has correlation in the temporal direction and the spatial direction, the levels of difference signals are lower than the sample values. Thus, since the difference signals are requantized with a smaller number of quantizing bits than the original number of quantizing bits, the amount of information can be compressed.

As an example of the quantizing apparatus using the difference signals, a nonlinear type quantizing apparatus is known. In the nonlinear type quantizing apparatus, the quantizing step width is finely divided at nearly 0 of the levels of the difference signals, whereas the quantizing step width is coarsely divided in proportion to the levels of the difference signals. In the conventional quantizing apparatus (including the nonlinear type quantizing apparatus) quantizes all levels of the difference signals. For example, when one sample (one pixel) of a digital picture signal is quantized with eight bits, the difference signals have values in the range from (−255 to +255). In other words, the conventional quantizing apparatus performs the quantizing process for all the range.

Since the conventional quantizing apparatus performs the quantizing process for all the range of the difference signals, when the number of quantizing bits is decreased, the quantizing accuracy is deteriorated. In contrast, when the number of quantizing bits is increased, the amount of information generated is proportionally increased. Thus, when data is decoded, the quality of the resultant audio signal and picture signal is not satisfactorily high.

To solve this problem, the applicant of the present invention has proposed a quantizing method for block segmenting difference signals and concentrating the distribution of levels of the difference signals so as to requantize data with a smaller number of quantizing bits than before. In this method, a quantizing step $\Delta$ for the requantizing process and a zero position flag ZR that represents a code signal of difference signals that includes value 0 should be transmitted.

Since the amount of data is reduced by the prediction encoding process and the requantizing process, the amount of data to be transmitted can be remarkably decreased without deterioration of the quality of the decoded signal. However, since the quantizing step $\Delta$ and the zero position flag ZR should be transmitted for each block, they prevent the amount of data to be transmitted from being reduced.

OBJECT AND SUMMARY OF THE INVENTION

Therefore, an object of the present invention is to provide an information signal encoding apparatus for reducing the amount of data of additional information so as to reduce the amount of quantized output data, an encoding method thereof, and a decoding method thereof.

A first aspect of the present invention is an information signal encoding apparatus for encoding an input digital information signal in such a manner that the amount of data generated decreases, the apparatus comprising a means for generating difference signals representing differences between sample values of the input digital information signal, a means for block segmenting the difference signals, a means for detecting the maximum value and minimum value of each block and generating a quantizing step and a zero position flag by the maximum value and the minimum value, the zero position flag representing a code of quantized output data that includes 0, a predicting means for generating a predicted value of the quantizing step and a predicted value of the zero position flag, a quantizing means for requantizing the block-segmented difference signals by the quantizing step and the predicted value of the zero position flag, and a transmitting means for transmitting the quantized output data.

A second aspect of the present invention is an information signal encoding method for encoding an input digital information signal in such a manner that the amount of data generated decreases, the method comprising the steps of generating difference signals representing differences between sample values of the input digital information signal, block segmenting the difference signals, detecting the maximum value and minimum value of each block and generating a quantizing step and a zero position flag by the maximum value and the minimum value, the zero position flag representing a code of quantized output data that includes 0, generating a predicted value of the quantizing step and a predicted value of the zero position flag, requantizing the block-segmented difference signals by the quantizing step and the predicted value of the zero position flag, and transmitting the quantized output data.

A third aspect of the present invention is an information signal encoding apparatus for generating at least first hierarchical data and second hierarchical data by an input digital information signal, encoding the first hierarchical data and the second hierarchical data, and transmitting the encoded data, the apparatus comprising a means for forming the second hierarchical data with a resolution lower than the first hierarchical data, a means for predicting the first hierarchical data by the second hierarchical data, a means for forming difference signals representing differences between the predicted data and the first hierarchical data, a means for block segmenting the difference signals, a means for detecting the maximum value and minimum value of each block and generating a quantizing step and a zero position flag by the maximum value and the minimum value, the zero position flag representing a code of quantized output data that includes 0, a predicting means for generating a predicted value of the quantizing step and a predicted value of the zero position flag, a quantizing means for requantizing the block-segmented difference signals by the quantizing step and the predicted value of the zero position flag, and a transmitting means for transmitting the quantized output data.

A fourth aspect of the present invention is an information signal encoding method for generating at least first hierarchical data and second hierarchical data by an input digital information signal, encoding the first hierarchical data and the second hierarchical data, and transmitting the encoded data, the method comprising the steps of forming the second hierarchical data with a resolution lower than the first hierarchical data, predicting the first hierarchical data by the second hierarchical data, forming difference signals representing differences between the predicted data and the first hierarchical data, block segmenting the difference signals, detecting the maximum value and minimum value of each block and generating a quantizing step and a zero position flag by the maximum value and the minimum value, the zero position flag representing a code of quantized output data that includes 0, generating a predicted value of the quantizing step and a predicted value of the zero position flag, requantizing the block-segmented difference signals by the quantizing step and the predicted value of the zero position flag, and transmitting the quantized output data.

A fifth aspect of the present invention is an information signal decoding method for decoding data that has been quantized by a zero position flag and a quantizing flag, the zero position flag representing a code of quantized output data that includes 0, the method comprising the steps of predicting the zero position flag and the quantizing step, converting the quantized output data to a representative value by the zero position flag and a predicted value of the quantizing step, and block desegmenting dequantized difference signals and restoring original sequence of data.

According to the present invention, it is not substantially necessary to transmit the zero position flag ZR and the quantizing step $\Delta$ used in the quantizing process. Thus, the amount of data to be transmitted can be further reduced.

These and other objects, features and advantages of the present invention will become more apparent in light of the following detailed description of best mode embodiments thereof, as illustrated in the accompanying drawings.

BRIEF DESCRIPTION OF THE DRAWINGS

FIGS. 3A and 3B are schematic diagrams for explaining generation of difference signals and block segmentation thereof according to the embodiment of the present invention;

FIG. 5 is a block diagram showing an example of the structure of an offset detecting circuit according to the embodiment of the present invention;

FIG. 7 is a block diagram showing the structure of a class category adaptive predicting circuit according to the embodiment of the present invention;

FIG. 12 is a schematic diagram for explaining an example of the hierarchical encoding process;

DETAILED DESCRIPTION OF PREFERRED EMBODIMENTS

Figure 1:
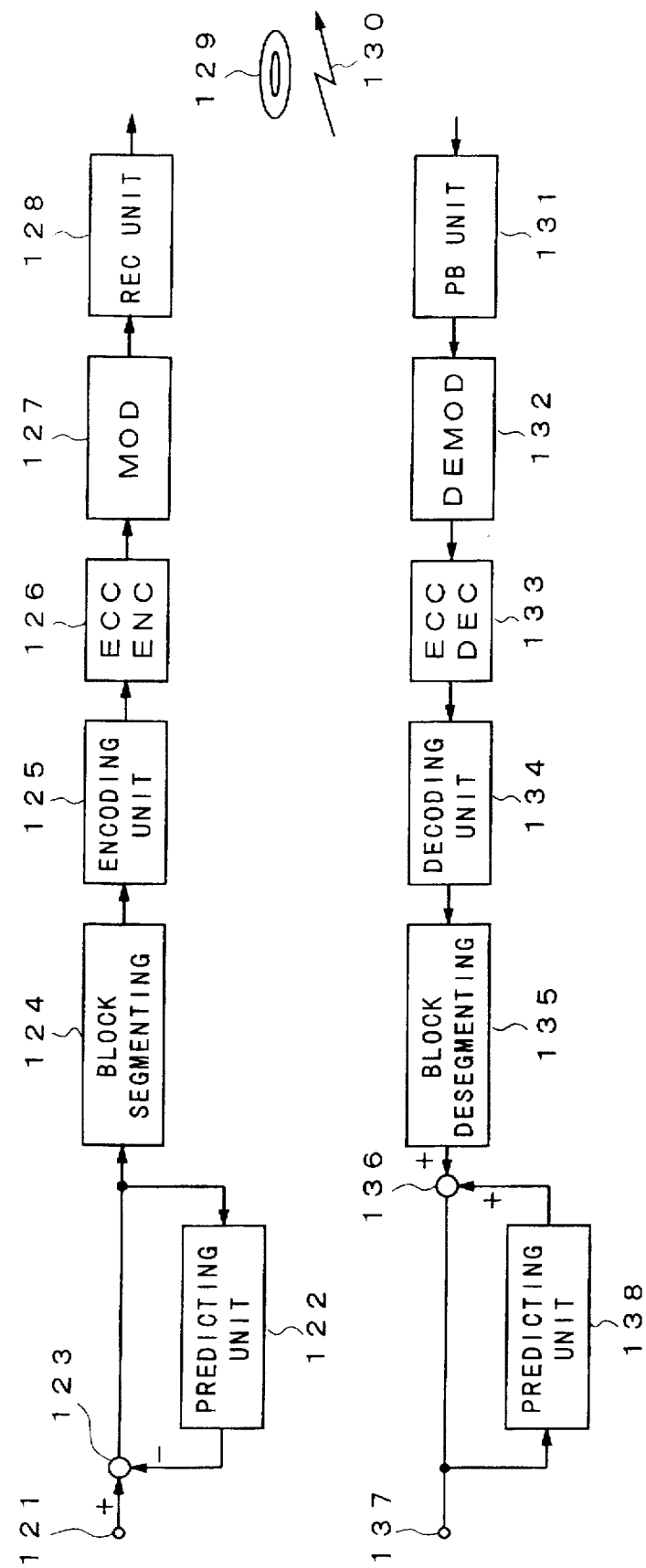
FIG. 1 is a block diagram showing an example of the structure of a recording/reproducing system or a transmitting system according to the present invention.

Next, with reference to the accompanying drawings, embodiments of the present invention will be described. The present embodiment is applied for a digital picture signal of which a video signal has been sampled at a predetermined sampling frequency and each sample has been converted into a predetermined number of quantizing bits. FIG. 1 shows the overall structure of the system according to the embodiment of the present invention.

In FIG. 1, a digital video signal is supplied to an input terminal 121. The input signal is supplied to a subtracting unit 123. The output data (difference signals) of the subtracting unit 123 is supplied to a block segmenting circuit 124 and a predicting unit 122. The predicting unit 122 generates a predicted signal and supplies it to the subtracting unit 123. The subtracting unit 123 subtracts the predicted signal from the input signal and generates a predicted difference. The predicted difference is supplied as difference signals to the block segmenting circuit 124. The block segmenting circuit 124 converts data of raster scanning sequence into data of block sequence. The block-segmented difference signals are supplied to an encoding unit 125. As will be described above, the encoding unit 125 requantizes block-segmented difference signals with a smaller number of bits than before and reduces the data amount of the quantizing step $\Delta$ and the zero position flag ZR used in the requantizing process by the class category adaptive predicting method.

The encoded output data of the encoding unit 125 is supplied to an error-correction-code encoder 126. The error-correction-code encoder 126 adds a redundant code for the error-correction-code encoding process to the output data of the encoding unit 125. The output data of the error-correction-code encoder 126 is supplied to a modulating portion 127. The modulating portion 127 modulates the digital signal as the output signal of the error-correction-code encoder 126 into a format of which the digital signal can be recorded or transmitted. The output signal of the modulating portion 127 is supplied to a recording unit 128. The recording unit 128 records the record signal on an information signal record medium 129. Alternatively, data can be transmitted through a transmission path 130. In this case, a transmitting unit is used instead of the recording unit 128. The information signal record medium 129 is a disc-shaped or tape-shaped record medium corresponding to the magnetic recording method, the magneto optical recording method, the phase change recording method, or the like. In addition, a semiconductor memory is a kind of record medium.

Data recorded on the record medium 129 is reproduced (played back) by a reproducing unit (or playback unit) 131. Alternatively, data is received through the transmission path 130. The output data of the reproducing unit 131 is supplied to a demodulating portion 132. The demodulating portion 132 demodulates the output data of the reproducing unit 131. The output data (demodulated data) of the demodulating portion 132 is supplied to an error-correction-code decoder 133. The decoder 133 corrects an error of the demodulated data with a redundant code. When the decoder 133 cannot correct an error of the demodulated data, the decoder 133 quietly trims the error.

The output data of the error-correction-code decoder 133 is supplied to a decoding unit 134. As will be described later, the decoding unit 134 performs the dequantizing process for converting the quantized output data into a representative value (dequantized value). The dequantizing process is the reverse process of the encoding unit 125. The decoding unit 134 restores the quantizing step width $\Delta$ and the zero position flag ZR (that have not been transmitted) by the class category adaptive predicting process and performs the dequantizing process. The decoding unit 134 generates decoded difference signals. The decoded difference signals are supplied to a block desegmenting circuit 135. The block desegmenting circuit 135 restores the data of block sequence to the data of raster scanning sequence.

The decoded difference signals are supplied to an adding circuit 136. The adding circuit 136 generates a decoded picture signal. The decoded picture signal is obtained from an output terminal 137. In addition, the decoded picture signal is supplied to a predicting unit 138. The predicting unit 138 generates a predicted signal. The predicted signal is supplied to the adding circuit 136.

Figure 2:
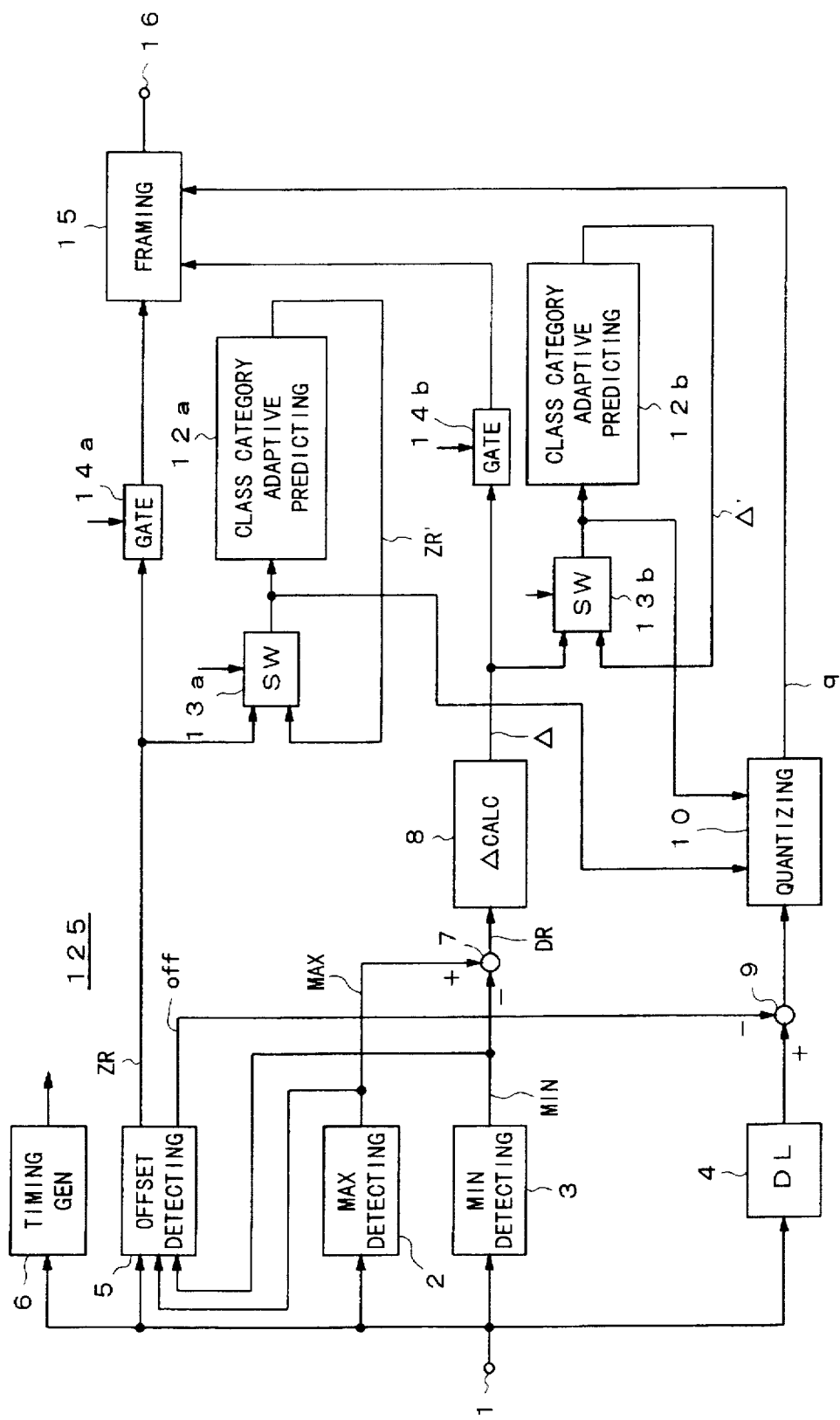
FIG. 2 is a block diagram showing an embodiment of the present invention.

FIG. 2 shows an example of the structure of the encoding unit 125. Block-segmented difference signals are supplied from the block segmenting circuit 124 to an input terminal 1. FIGS. 3A and 3B schematically show the structure of the difference signals. Each square in FIG. 3A corresponds to one pixel. In FIG. 3A, letters a to h represent locally decoded pixel values. Letters A to P represent pixel values that have not been encoded. A predicted value A' of a pixel value A is generated with adjacent locally-decoded pixel values by the predicting unit 122. For example, the predicted value A' is formed corresponding to a predicting formula as in A'=4c−3(b−f), A'=f+c−b, or the like. The predicted values of the pixel values B, C, and so forth are calculated with such predicting formulas. A predicted value is generally formed by a formula $\alpha a + \beta b + \gamma f$ (where $\alpha$, $\beta$, and $\gamma$ are constants).

The subtracting unit 123 subtracts a predicted value (for example, A') from a pixel value (for example, A) and generates a difference signal $\Delta a$. Likewise, the subtracting unit 123 generates difference signals $\Delta b$, $\Delta c$, and so forth. The block segmenting circuit 124 converts the generated difference signals into blocks. For example, as represented by a box of solid lines, data of a block composed of difference signals $\Delta a$ to $\Delta p$ corresponding to a block composed of (4×4) pixels is formed by the block segmenting circuit 124. When a digital audio signal is processed, predicted values in the temporal direction are formed and thereby one-dimensional blocks of difference signals are formed.

When the difference signals are block segmented, the concentration of the range of levels of the difference signals can be improved. When one pixel is composed of eight bits of data, the distribution of the frequency of difference signals of one screen ranges from −255 to +255 with the center of 0. Thus, the frequency of which the difference is 0 is maximum. However, when the difference signals are block segmented, the distribution of levels of the difference signals is more concentrated than the original distribution.

This is because the values of the difference signals of blocks in a narrow space are smaller than those of one screen in probability. In addition, the values of the difference signals of blocks have strong correlation. Thus, the block segmented difference signals can be requantized with a smaller number of bits than the original number of quantizing bits. When the levels of the brightness of blocks gradually vary in for example the diagonal direction, the frequency of the value 0 does not become maximum. The concentration of the distribution of levels of the difference signals can be also improved by another method rather than the block segmenting method.

Returning back to FIG. 2, the encoding unit 125 will be described. Difference signals are supplied from the input terminal 1 to a maximum value detecting circuit 2, a minimum value detecting circuit 3, and a delaying circuit 4. The maximum value detecting circuit 2 detects a maximum value MAX of each block. In contrast, the minimum value detecting circuit 3 detects a minimum value MIN of each block. The detected maximum value MAX and minimum value MIN are supplied to an offset detecting circuit 5 and a subtracting circuit 7. A timing generating unit 6 generates a timing signal corresponding to a block position of difference signals.

The subtracting circuit 7 calculates DR=MAX−MIN and obtains the dynamic range DR. The dynamic range DR is supplied to a quantizing step calculating circuit 8. The circuit 8 calculates a quantizing step $\Delta$ with ($\Delta = DR/2^n$).

As will be described later, the block-segmented difference signals, the maximum value MAX, and the minimum value MIN are supplied to the offset detecting circuit 5. When the block includes a difference signal with the value 0, the offset detecting circuit 5 calculates a value for compensating data so that a dequantized value that is closest to 0 of those corresponding to the maximum value MAX and the minimum value MIN becomes 0. This value is referred to as an offset off. In addition, the offset detecting circuit 5 detects a zero position flag that represents a quantized code including value 0. The calculated offset off is supplied from the offset detecting circuit 5 to a subtracting circuit 9.

Difference signals are supplied from the delay time compensating circuit 4 to a subtracting circuit 9. The subtracting circuit 9 subtracts the offset off from the difference signals. A quantizing circuit 10 requantizes the corrected difference signals with the quantizing step and generates a quantized output q.

Figure 4A:
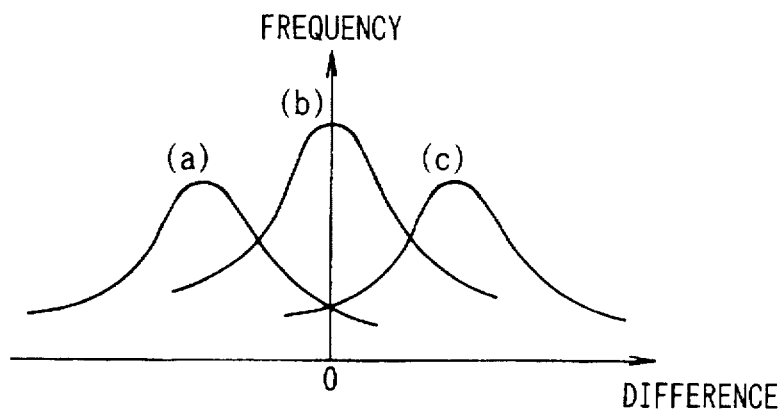
FIGS. 4A, 4B, and 4C are schematic diagrams for explaining the quantizing process according to the embodiment of the present invention.
Figure 4B:
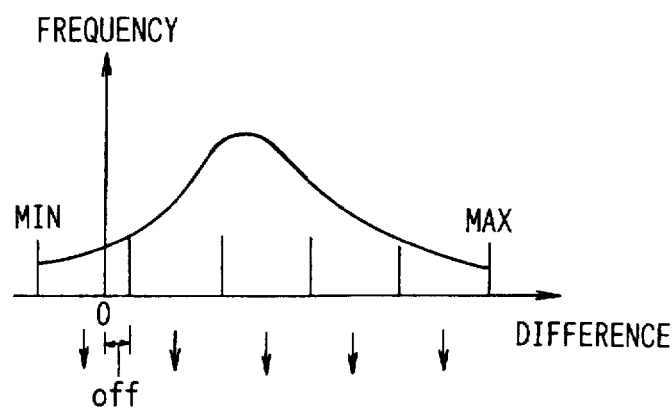
Figure 4C:
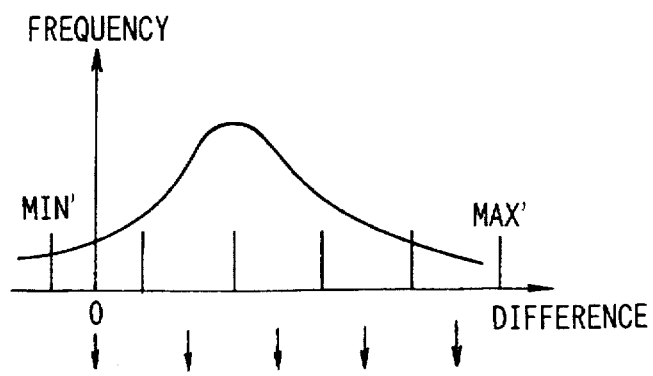

Next, with reference to FIGS. 4A, 4B, and 4C, a data correcting process performed by the offset off will be described. As described above, difference signals generated by the prediction encoding process deviate block by block as shown in FIG. 4A. In FIG. 4A, a difference signal a deviates on the negative side. A difference signal b does not deviate. In other words, the maximum frequency of the difference signal b accords with the value 0. A difference signal c deviates on the positive side. FIG. 4B shows the distribution of the frequency of difference signals of a particular block. When difference signals are quantized, the range between MAX and MIN is divided by 5. The same code is assigned to difference signals in each of the divided regions. When these codes are decoded, they are converted into a representative value that is the center value of each of the divided regions (denoted by arrows in FIG. 4B). Generally, when the number of bits of a code is n, the range between MAX and MIN is divided into $2^n$ regions.

As is clear from FIG. 4B, the value 0 of the difference signals deviates from the maximum frequency. It is important to match the value 0 of the difference signals with the maximum frequency so as to correctly restore the original signals. Otherwise, errors accumulate and thereby the picture quality remarkably deteriorates. To prevent the prediction errors from accumulating, it is preferable to periodically transmit original data for refreshing.

In this embodiment, the difference between a value that is closest to 0 of dequantized values and the value 0 is calculated as an offset off. The subtracting circuit 9 subtracts the offset off from the difference signals. As a result, the value 0 of the difference signals can be represented with the value 0 of the dequantized values. In the present invention, to reduce the amount of data to be transmitted, the dynamic range information (DR, MIN, MAX, and so forth) is not transmitted. Thus, the quantizing step $\Delta$ and the zero position flag ZR that represents the position of 0 of the quantized output data are required. In addition, according to the present invention, as will be described later, the transmission of the quantizing step $\Delta$ and the zero position flag ZR is also omitted.

FIG. 5 shows an example of the structure of the offset detecting circuit 5 that generates the offset off and the zero position flag ZR of each block. A maximum value MAX and a minimum value MIN of each block are supplied to a subtracting unit 21. The subtracting unit 21 subtracts MIN from MAX and calculates a dynamic range DR of the block. The dynamic range DR is supplied to a zero position detecting circuit 22, a code detecting circuit 23, and a calculating circuit 25. The zero position detecting circuit 22 supplies the zero position flag ZR to an output terminal 24. The calculating circuit 25 supplies the offset off to an output terminal 26.

The zero position detecting circuit 22 of the offset detecting circuit 5 generates the zero position flag ZR by the number of requantizing bits n, the dynamic range DR, and the minimum value MIN corresponding to the following formula (1).

$$ZR = \lfloor -MIN \times (2^n/DR) \rfloor \quad (1)$$
$$= \lfloor -MIN/\Delta \rfloor$$

where [ ] is a function for truncating the given value to the closest integer.

The code detecting circuit 23 of the offset detecting circuit 5 generates a code by the number of requantizing bits n, the dynamic range DR, and the minimum value MIN corresponding to the following formula.

$$code = \lfloor -MIN \times (2^n/DR) \rfloor$$
$$= \lfloor -MIN/\Delta \rfloor$$

where | | is a function for truncating the given value to the closest integer.

The calculating circuit 25 generates the offset off by the dynamic range DR, the minimum value MIN, and code corresponding to the following formula.

$$off = MIN + code \times DR/2n + DR/2^{n+1} \quad (2)$$
$$= MIN + code \times \Delta + \Delta/2$$

Next, with reference to FIG. 6, the quantizing process according to the embodiment of the present invention will be described in detail. FIG. 6A shows the range of levels of difference signals of a particular block. In other words, referring to FIG. 6A, MIN=−5, MAX=+35, DR=40, and n (number of requantizing bits)=2. Thus, $\Delta = 40/2^2 = 10$. Depending on the level range of the difference signals of the block, (00), (01), (10), or (11) is generated as the code q. The zero position flag ZR represents code (00) that includes value 0 of difference signals or the code itself. The restored values of these codes are center values of the level ranges (0, +10, +20, and +30).

The quantizing process is a process for dividing the difference signals by the quantizing step and truncating the quotients to closest integers. However, when the level values of the difference signals are divided by the quantizing step, the relative values (quantized output) of the difference signals of the block cannot be obtained. Thus, to represent the reference position, the zero position flag ZR is required. In addition, unlike with the case shown in FIG. 6A, when the minimum value MIN of the difference signals is larger than 0 or when the maximum value MAX of the difference signal is smaller than 0, the level range of the block segmented difference signals does not cross 0. In such cases, assuming that a difference signal with value 0 is present, the zero position flag ZR is generated.

Figures 6A, 6B, 6C:
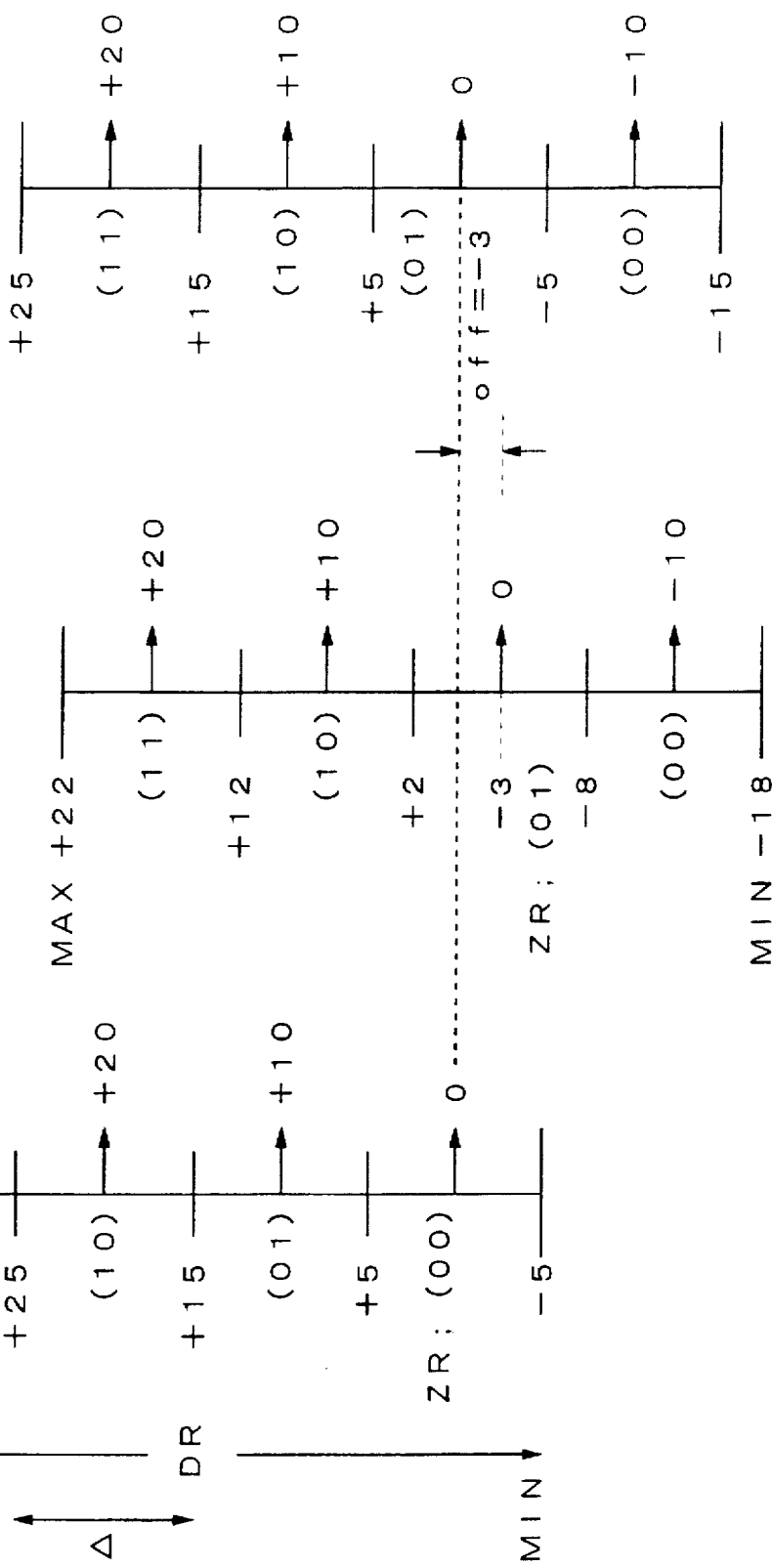
FIGS. 6A, 6B, and 6C are schematic diagrams for explaining the quantizing process according to the embodiment of the present invention.

In the case shown in FIG. 6A, the value 0 of the difference signals corresponds to the value 0 of dequantized values. In other words, this case represents that off =0. When data quantized as shown in FIG. 6A is transmitted, the zero position flag ZR, the quantizing step $\Delta$, and the code q are transmitted. On the decoding side, the dequantizing process for multiplying the code q by the quantizing step $\Delta$ and treating the restored value of the code with the zero position flag ZR as value 0 is performed.

FIG. 6B shows another practical example of difference signals of a block. When the difference signals are not corrected with the offset off, value −3 of the difference signals is treated as restored value 0 by the dequantizing process. When the difference signals are corrected with the offset off, as shown in FIG. 6C, the value 0 of the difference signals corresponds to the value 0 of dequantized values.

When the above-described quantizing process is performed, the quantizing step $\Delta$ and the zero position flag ZR should be transmitted. However, in the embodiment of the present invention, the amount of data of the additional information is further reduced. In other words, to reduce the amount of data to be transmitted, the additional information is not transmitted unless an exception process is performed. The exception process is performed when additional information of adjacent blocks necessary for predicting the target block is not present because the target block is present on the periphery of the screen. In the exception process, the generated quantizing step $\Delta$ and the zero position flag ZR are transmitted.

Returning to FIG. 2, the quantizing circuit 10 requantizes the difference signals corrected by the offset off with the quantizing step $\Delta$ and generates quantized output q. The quantizing step and the zero position flag are supplied to the quantizing circuit 10 through switching circuits 13a and 13b. The switching circuit 13a selects the zero position flag ZR detected by the offset detecting circuit 5 or a predicted value ZR' predicted by a class category adaptive predicting circuit 12a. The switching circuit 13b selects the quantizing step $\Delta$ calculated by the quantizing step calculating circuit 8 or a predicted value $\Delta$' predicted by the class category adaptive predicting circuit 12b.

The output data of the switching circuit 13a is also supplied to the class category adaptive predicting circuit 12a. The output data of the switching circuit 13b is also supplied to the class category adaptive predicting circuit 12$b$. In addition, the zero position flag ZR is supplied from the offset detecting circuit 5 to a framing circuit 15 through a gate circuit 14. Output data $\Delta$ of the quantizing step calculating circuit 8 is supplied to the framing circuit 15 through a gate circuit 14$b$. In addition, output data q of the quantizing circuit 10 is also supplied to the framing circuit 15. These data is output as predetermined frame-structured data to an output terminal 16 of the framing circuit 9.

The switching circuits 13$a$ and 13$b$ and the gate circuits 14$a$ and 14$b$ are controlled with a timing signal supplied from the timing generator 6. (The connections from the timing generator 6 to the switching circuits 13$a$ and 13$b$ and the gate circuits 14$a$ and 14$b$ are not shown.) As described above, when a block to be quantized is present on the periphery of the screen, since data necessary for predicting the target block is not present, the exception process is performed. In the exception process, the switching circuits 13$a$ and 13$b$ select the real zero position flag ZR and the quantizing step $\Delta$. In addition, the gate circuits 14$a$ and 14$b$ are turned on. Since the exception process is performed on the periphery of the screen, the timing generating unit 6 generates a timing signal that represents a block on the periphery of the screen. With the timing signal, the switching circuits 13$a$ and 13$b$ and the gate circuits 14$a$ and 14$b$ are controlled. According to the embodiment of the present invention, in the exception process, the additional information (ZR and $\Delta$) is transmitted. In the normal process, the transmission of the additional information is omitted.

The class category adaptive predicting circuit 13$a$ estimates a predicted value ZR' by the zero position flag supplied from the switching circuit 13$a$. The class category adaptive predicting circuit 12$a$ has a memory that stores predicting coefficients x1, x2, and x3 that are pre-learnt for each class. With a pattern of zero position flags on the periphery of the supplied zero position flag, a class is determined. Corresponding to the class, predicting coefficients x1, x2, and x3 are read. With the predicting coefficients that are read and the zero position flag ZR that has been supplied, the predicted value ZR' of the zero position flag ZR is estimated.

Figures 8A, 8B, 8C:
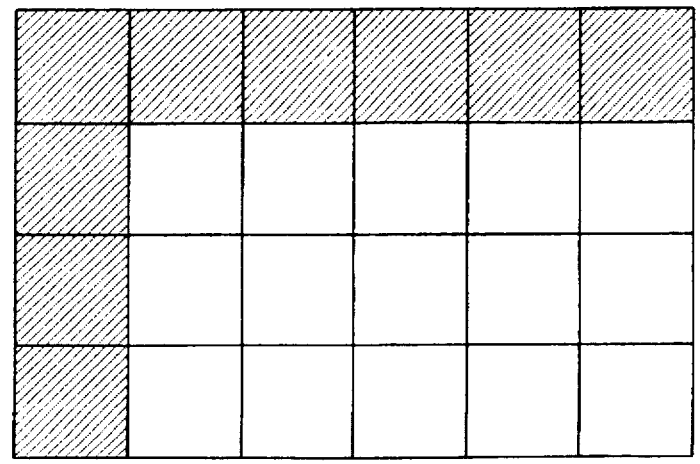
FIGS. 8A, 8B, and 8C are schematic diagrams for explaining the process of the class category adaptive predicting circuit.

When the predicted value ZR' of the zero position flag corresponding to the zero position flag ZR of the block surrounded by solid lines of FIG. 8A is estimated, a zero position flag ZR2 of a block that is adjacently disposed above the target block, a zero position flag ZR1 of a block that is adjacently disposed above and on the left of the target block (namely, a block adjacently disposed at the upper left diagonal position of the target block), and a zero position flag ZR3 of a block that is adjacently disposed on the left of the target block are used. FIG. 8 shows an example of a screen composed of (4×6=24) blocks. A class is determined corresponding to a pattern of the zero position flags ZR1, ZR2, and ZR3. Predicting coefficients x1, x2, and x3 that are prelearnt are read corresponding to the class from the memory. With the following formula (3), the predicted value ZR' of the zero position flag is calculated.

$$ZR'=x1 \times ZR1+x2 \times ZR2+x3 \times ZR3 \qquad (3)$$

The class category adaptive predicting circuit 12$b$ has a memory that stores predicting coefficients y1, y2, and y3 that are pre-learnt for each class, determines a class corresponding to the pattern of the quantizing steps of the adjacent blocks, and reads the predicting coefficients corresponding to the class. With the predicting coefficients that are read and the quantizing steps of the adjacent blocks, the predicted value $\Delta$' of the quantizing step is estimated.

When a predicted value $\Delta$' of a quantizing step of a block surrounded by solid lines shown in FIG. 8B is estimated, a quantizing step $\Delta$2 of a block that adjacently disposed above the target block, a quantizing step $\Delta$1 of a block that adjacently disposed above and on the left of the target block (namely, a block adjacently disposed at the upper left diagonal position of the target block), and a quantizing step $\Delta$3 of a block that is adjacently disposed on the left of the target block are used. A class is determined corresponding to a pattern of the quantizing steps $\Delta$1, $\Delta$2, and $\Delta$3 on the periphery of the quantizing step $\Delta$. Predicting coefficients y1, y2, and y3 that are prelearnt are read corresponding to the class from the memory. With the following formula (4), the predicted value $\Delta$' of the quantizing step is calculated.

$$\Delta'=y1 \times \Delta1+y2 \times \Delta2+y3 \times \Delta3 \qquad (4)$$

As described above, the class category adaptive predicting circuits 12$a$ and 12$b$ use the zero position flags and quantizing steps of adjacent blocks of the block to be predicted. Thus, as shown in FIG. 8C, when a block to be predicted is present in the peripheral (hatched) portion of the screen, the exception process is required. For the blocks on the periphery of the screen, the zero position flag ZR and the quantizing step $\Delta$ are used. To predict a block, ZR4 (see FIG. 8A) and $\Delta$4 (see FIG. 8B) may be used. However, in this case, the number of blocks for the exception process increases.

Next, with reference to FIG. 7, the structure of the class category adaptive predicting circuit 12$a$ will be described in detail. The zero position flag is supplied from the class category adaptive predicting circuit 12$a$ to a peripheral code value forming portion 32 through an input terminal 31. As shown in FIG. 8A, the peripheral code value forming portion 32 supplies three zero position flags ZR1, ZR2, and ZR3 that are present on the periphery of a block to be predicted to a class categorizing portion 33.

The class categorizing portion 33 detects a pattern of the three zero position flags ZR1, ZR2, and ZR3 and supplies a class code corresponding to the pattern to a predicting coefficient memory 34. The class categorizing portion 33 is composed of a one-bit ADRC or the like. In this case, the class categorizing portion 33 outputs a three-bit class code. The predicting coefficient memory 34 has stored pre-learnt predicting coefficients for each class. The predicting coefficient memory 34 supplies predicting coefficients x1, x2, and x3 corresponding to the class code as the address signal to a prediction calculating portion 36. The three zero position flags ZR1, ZR2, and ZR3 are supplied to the prediction calculating portion 36 through a delaying portion 35. The prediction calculating portion 35 calculates a predicted value ZR' of the zero position flag ZR by the predicting coefficients x1, x2, and x3 and three zero position flags ZR1, ZR2, and ZR3.

As shown in FIG. 2, the generated predicted value ZR' is supplied to the switching circuit 13$a$. In the exception process, since required zero position flags are not present on the periphery of the target block, the switching circuit 13$a$ selects the zero position flag ZR supplied from the offset detecting circuit 5. In the normal process, the switching circuit 13$a$ selects the predicted zero position flag ZR'.

The structure of the class category adaptive predicting circuit 12$b$ is the same as the structure of the above-described class category adaptive predicting circuit 12$a$. In other words, with three adjacent quantizing steps $\Delta$1, $\Delta$2, and $\Delta$3 and pre-learnt predicting coefficients y1, y2, and y3 stored in the memory, the class category adaptive predicting circuit 12$b$ generates a predicted value $\Delta$' of the quantizing step. As shown in FIG. 2, the generated predicted value $\Delta$' is supplied to the switching circuit 13$b$. In the exception process, since required quantizing steps are not present on the periphery of the target block, the switching circuit 13b selects the quantizing step Δ supplied from the quantizing step calculating circuit 8. In the normal process, the switching circuit 13b selects the predicted quantizing step Δ'.

Next, predicting coefficients used in the class category adaptive predicting circuits 12a, 12b, 46a, and 46b will be described. The predicting coefficients are pre-learnt. In this example, a learning process for generating predicting coefficients x1, x2, and x3 for each class corresponding to zero position flags will be described. The predicting coefficients x1, x2, and x3 are generated by the method of least squares. The method of least squares is applied in the following manner.

The following formula (9) is obtained from the formula (7) of the difference equation.

$$e_1 \frac{\partial e_i}{\partial w_1} = x_{i1}, \frac{\partial e_i}{\partial w_2} = x_{i2}, \ldots, \frac{\partial e_i}{\partial w_n} = x_{in} \quad (i = 1, 2, \ldots, m) \quad (9)$$

With the formulas (8) and (9), the following formula (10) is obtained.

$$\sum_{i=1}^{m} e_i x_{i1} = 0, \sum_{i=1}^{m} e_i x_{i2} = 0, \ldots, \sum_{i=1}^{m} e_i x_{in} = 0 \quad (10)$$

With the formulas (7) and (10), the following formula (11) is obtained as a normal equation.

$$\begin{cases} \left(\sum_{j=1}^{m} x_{j1} x_{j1}\right) w_1 + \left(\sum_{j=1}^{m} x_{j1} x_{j2}\right) w_2 + \ldots + \left(\sum_{j=1}^{m} x_{j1} x_{jn}\right) w_n = \left(\sum_{j=1}^{m} x_{j1} y_j\right) \\ \left(\sum_{j=1}^{m} x_{j2} x_{j1}\right) w_1 + \left(\sum_{j=1}^{m} x_{j2} x_{j2}\right) w_2 + \ldots + \left(\sum_{j=1}^{m} x_{j2} x_{jn}\right) w_n = \left(\sum_{j=1}^{m} x_{j2} y_j\right) \\ \vdots \\ \left(\sum_{j=1}^{m} x_{jn} x_{j1}\right) w_1 + \left(\sum_{j=1}^{m} x_{jn} x_{j2}\right) w_2 + \ldots + \left(\sum_{j=1}^{m} x_{jn} x_{jn}\right) w_n = \left(\sum_{j=1}^{m} x_{jn} y_j\right) \end{cases} \quad (11)$$

As a general example in the learning process, assuming that X is input data (ZR1, ZR2, and ZR3), W is a predicting coefficient (x1, x2, and x3), and Y is a predicted value (DR'), the following formula (5) is considered.

Observation equation: $XW = Y$ \quad (5)

$$X = \begin{bmatrix} x_{11} & x_{12} & \ldots & x_{1n} \\ x_{21} & x_{22} & \ldots & x_{2n} \\ \vdots & \vdots & \ldots & \vdots \\ x_{m1} & x_{m2} & \ldots & x_{mn} \end{bmatrix}, W = \begin{bmatrix} w_1 \\ w_2 \\ \vdots \\ w_n \end{bmatrix} Y = \begin{bmatrix} y_1 \\ y_2 \\ \vdots \\ y_m \end{bmatrix} \quad (6)$$

The method of least squares is applied for data obtained by the observation equation. In the example of the formula (1), n is 3 and m is the number of data items learnt. With the observation equations of the formulas (5) and (6), a difference equation of the following formula (7) is considered.

$$XW = Y + E, E = \begin{bmatrix} e_1 \\ e_2 \\ \ldots \\ e_m \end{bmatrix} \quad (7)$$

With the difference equation of the formula (7), the most probable value of each predicting coefficient wi is the minimum value of the sum of square of an error. The sum of square of an error is given by the following formula.

$$\sum_{i=1}^{m} e_i^2$$

In other words, the condition of the following formula (8) is considered.

$$e_1 \frac{\partial e_1}{\partial w_i} + e_2 \frac{\partial e_2}{\partial w_i} + \ldots + e_m \frac{\partial e_m}{\partial w_i} = 0 \quad (i = 1, 2, \ldots, n) \quad (8)$$

Considering the condition with respect to i of the formula (8), w1, w2, ..., wn that satisfy the condition is calculated.

With the normal equation of the formula (11), the same number of equations as the number of unknowns can be obtained. Thus, the most probable value of each wi can be obtained. By the sweeping method (the method of elimination of Gauss-Jordan), simultaneous equations are solved. By the above-described method, predicting coefficients for individual classes are obtained.

Figure 9:
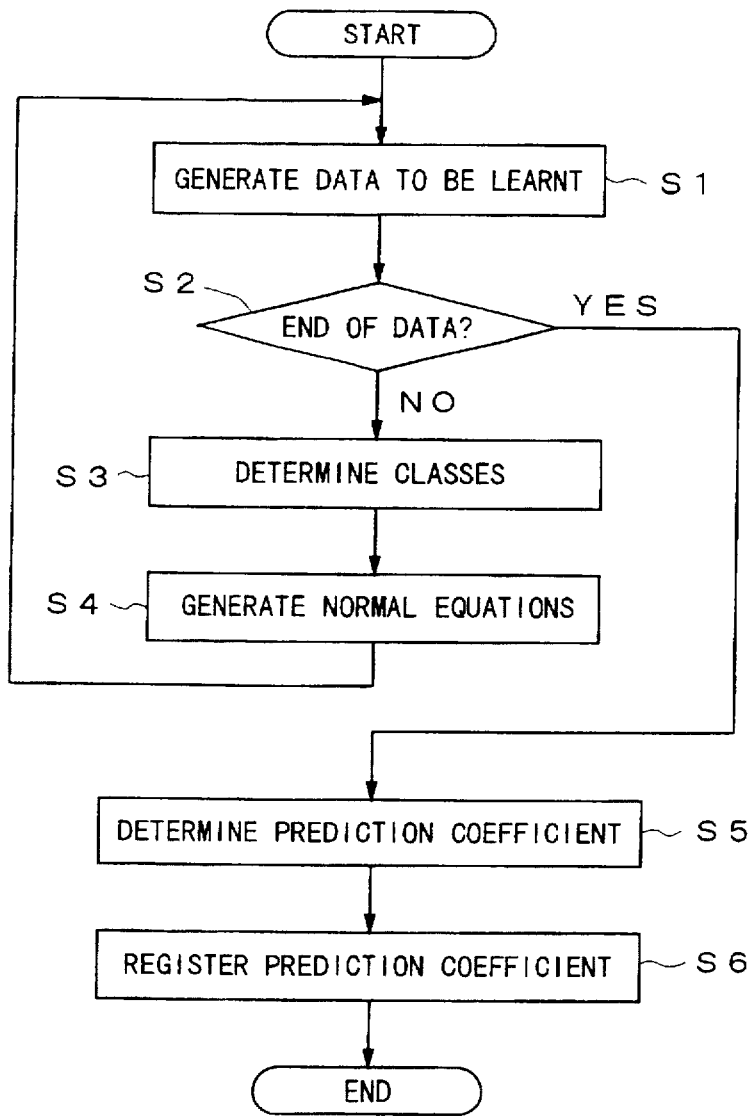
FIG. 9 is a flow chart showing an example of a coefficient learning method of the class category adaptive predicting circuit.

Next, with reference to a flow chart shown in FIG. 9, a learning process that is performed by software corresponding to the method of least squares will be described. At step S1 "GENERATE DATA TO BE LEARNT.", data to be learnt corresponding to a known picture is generated to learn a predicting coefficient wi. In other words, when a predicted value ZR' of the zero position flag is estimated, a zero position flag ZR to be learnt is generated. When a predicted value Δ' of the quantizing step is obtained, a quantizing step Δ to be learnt is generated. Thus, in the case that data to be learnt is generated, when a plurality of pictures rather than one picture is generated, predicting coefficients can be precisely obtained.

At step S2, it is determined whether or not the number of data items generated at step S1 is equal to the number of predicting coefficients. When the number of data items generated is less than the number of predicting coefficients, the flow advances to step S3. At step S3 "DETERMINE CLASSES.", classes of data to be learnt are categorized. Class of data to be learnt are determined corresponding to three adjacent code values. The three adjacent code values are a value corresponding to a block adjacently disposed above the target block, a value corresponding to a block adjacently disposed above and on the left of the target block (namely, a block adjacently disposed at the upper left diagonal position of the target block), and a value corresponding to a block adjacently disposed on the left of the target block. In other words, the class category adaptive predicting circuits 12a and 46a use ZR of blocks of the three adjacent positions. The class category adaptive predicting circuits 12b and 46b use Δ of blocks of the three adjacent positions.

Thereafter, the flow advances to step S4. At step S4 "GENERATE NORMAL EQUATIONS.", normal equations for individual classes are generated. At step S2 "DATA END ?", until the number of data items to be learnt becomes equal to the number of predicting coefficients, the process for generating normal equations is repeated.

When there is no data item to be learnt, the flow advances to step S5 "DETERMINE PREDICTING COEFFICIENTS." At step S5 "DETERMINE PREDICTING COEFFICIENTS.", normal equations of the formula (11) corresponding to many data items learnt for the individual classes are solved. In this example, as a solving method of the simultaneous equations, the above-described sweeping method is used. The predicting coefficients for the individual classes are registered to a storing portion such as a ROM at step S6 "REGISTER PREDICTING COEFFICIENTS." The addresses of the storing portion are divided corresponding to the classes. By the learning process, predicting coefficients of the class category adaptive prediction calculating portion is generated.

In addition, according to the present invention, the predicting coefficient memory that stores predicting coefficients for each class is provided. The prediction calculating portion performs a predicting calculation by the predicting coefficients stored in the predicting coefficient memory and peripheral code values and outputs a predicted value corresponding to an input code value. However, the present invention is not limited to such a structure. Instead of the predicting coefficient memory and the prediction calculating portion, a predicted value memory that stores predicted values for each class can be provided. In this case, the predicted values are pre-learnt and correspond to output values of the class category adaptive predicting portion.

Such methods have been proposed in Japanese Patent Laid-Open Publication No. 5-328185 by the applicant of the present patent application. As a real method for obtaining predicted values, a learning method using weighted averages is known. As another method, a learning method using a normalizing process is known.

Figure 10:
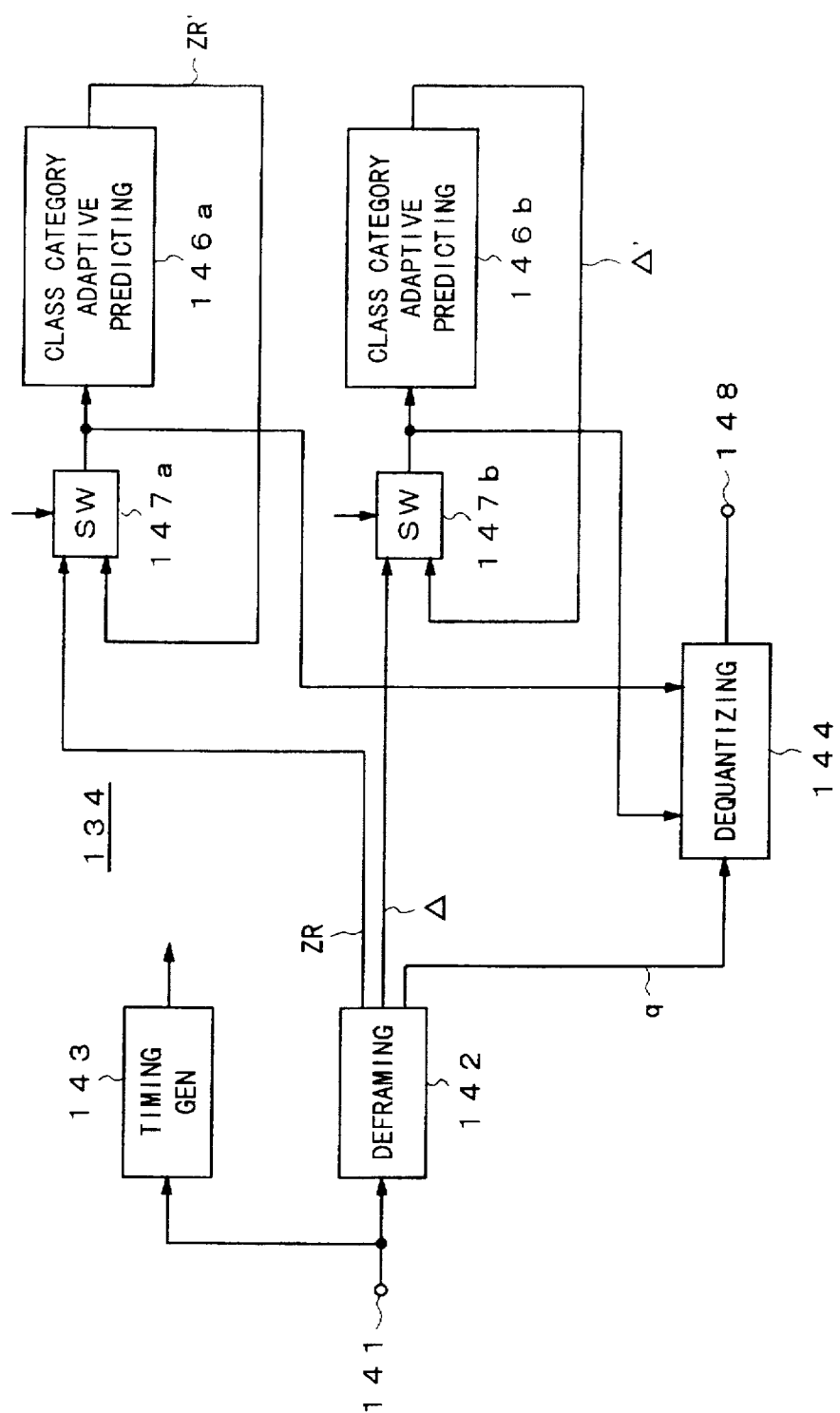
FIG. 10 is a block diagram showing a decoding unit according to the embodiment of the present invention.

Next, with reference to FIG. 10, an example of the decoding unit 134 shown in FIG. 2 will be described. Reproduced data as output data of the error-correction-code decoder 133 or received data is supplied to an input terminal 141 of the decoding unit 134. A deframing circuit 142 separates code q of difference signals, zero position flag ZR, and quantizing step Δ. A timing generating unit 143 generates a timing signal representing a block position in synchronization with input data. As with the encoding unit 125, the timing generating unit 143 generates a timing signal for controlling switching circuits 147a and 147b.

The separated code q is supplied to a dequantizing circuit 144. The dequantizing circuit 144 dequantizes the code q and obtains a restored representative value from an output terminal 148. Since the representative value is corrected with the offset off, the value 0 of the representative value corresponds to the value 0 of the difference signals. The zero position flag selected by the switching circuit 147a and the quantizing step selected by the switching circuit 147b are supplied to the dequantizing circuit 144. With such additional information, a code is converted into a representative value. The decoded difference signals are supplied from the output terminal 148 to the block desegmenting circuit 135 (see FIG. 1).

In the normal process, the switching circuit 147a selects the predicted value ZR' supplied from the class category adaptive predicting circuit 146. In the normal process, the switching circuit 147b selects the predicted value Δ' supplied from the class category adaptive predicting circuit 146a. As with the class category adaptive predicting circuit 12a of the encoding unit 125, the class category adaptive predicting circuit 146a generates the predicted value ZR' corresponding to zero position flags of the adjacent blocks. As with the class category adaptive predicting circuit 12b of the encoding unit 125, the class category adaptive predicting circuit 146b generates the predicted value Δ' corresponding to the quantizing steps of the adjacent blocks. The description of the structures of the class category adaptive predicting circuits 146a an 146b is omitted for preventing redundancy.

Next, a hierarchical encoding apparatus according to a second embodiment of the present invention will be described. In the hierarchical encoding apparatus, data is predicated between hierarchical levels. In addition, by applying a simple arithmetic operation for data between hierarchical levels, the number of pixels to be encoded can be prevented from increasing.

Figure 11:
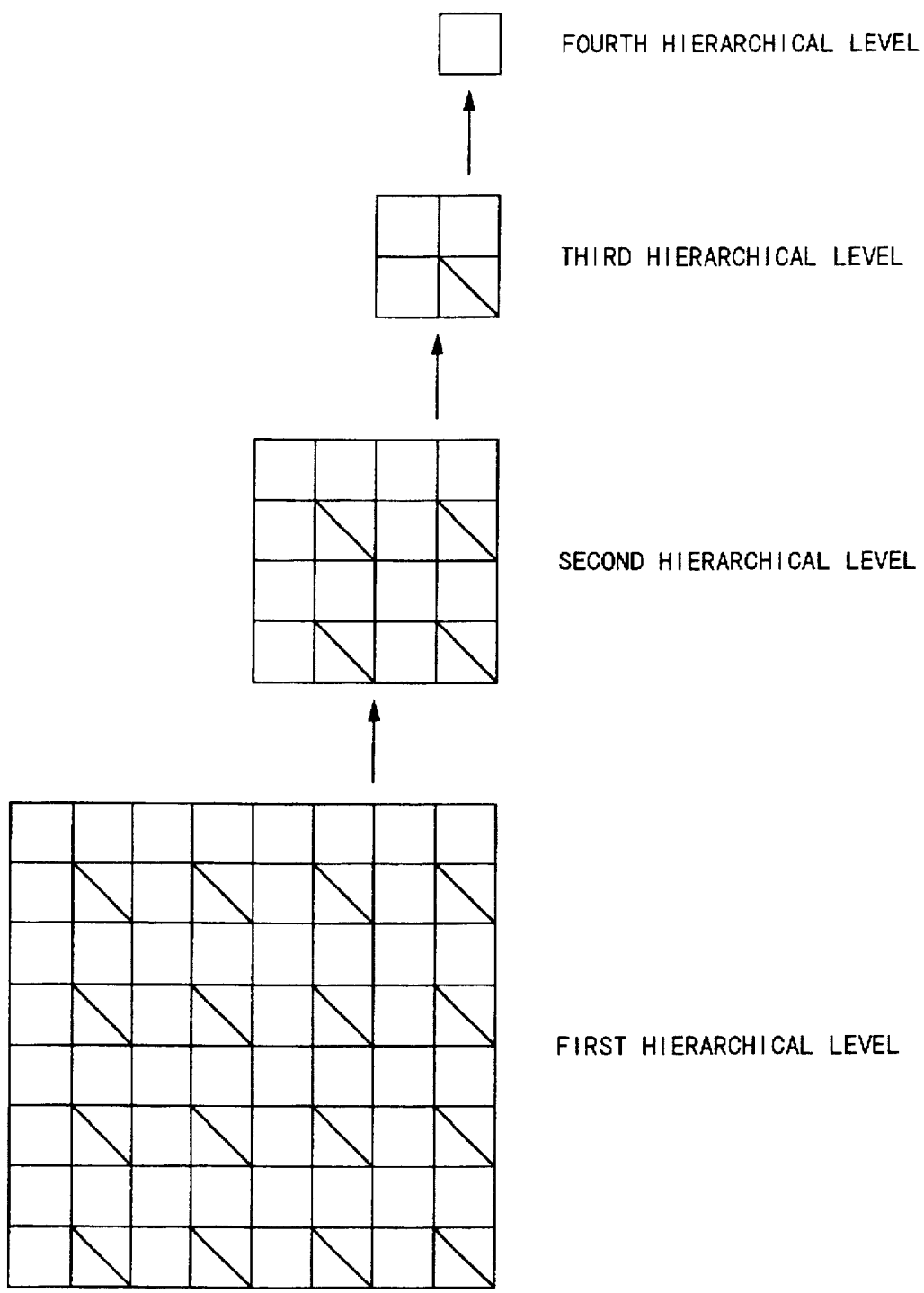
FIG. 11 is a schematic diagram for explaining an example of a hierarchical encoding process.

With reference to FIG. 11, the hierarchical encoding method will be described. FIG. 11 is a schematic diagram showing a four-level hierarchical structure having a first hierarchical level as the lowest hierarchical level (original picture) to a fourth hierarchical level as the highest hierarchical level. For example, when data of a higher hierarchical level is generated with the average value of four pixels of the lower hierarchical level that spatially corresponds thereto, the number of pixels to be transmitted can be prevented from increasing.

In other words, when data of the higher hierarchical level is denoted by M and pixel values of the lower hierarchical level are denoted by $x_0$, $x_1$, $x_2$, and $x_3$, data M is formed by the following formula.

$$M = \tfrac{1}{4} \cdot (x_0 + x_1 + x_2 + x_3)$$

The data M and three of four pieces of data (for example, other than $x_3$) are transmitted. On the receiving side or the reproducing side, the pixel $x_3$ that was not transmitted can be easily restored by the following simple arithmetic expression.

$$x_3 = 4 \cdot M - (x_0 + x_1 + x_2)$$

In FIG. 11, hatched squares represent pixels that are not transmitted.

FIG. 12 shows the structure of a five-level hierarchical encoding process corresponding to the above-described average calculating method. In this example, it is assumed that the first hierarchical level is a level with resolution of an input picture. The block size of the first hierarchical level is (1×1). Data of the second hierarchical level is generated by averaging four pixels of data of the first hierarchical level. In this example, data $x_2$ (0) of the second hierarchical level is generated by averaging the data $x_1(0)$ to $x_1(3)$ of the first hierarchical level. Likewise, data $x_2(1)$ to $x_2(3)$ of the second hierarchical level adjacent to $x_2(0)$ are generated by averaging four pixels of the first hierarchical level. The block size of the second hierarchical level is (½×½).

Data of the third hierarchical level is generated by averaging four pixels of the second hierarchical level that spatially corresponds thereto. The block size of the third hierarchical level is (¼×¼). Likewise, data of the fourth hierarchical level is generated with data of the third hierarchical level. The block size of the fourth hierarchical level is (⅛×⅛). Last, data $x_5(0)$ of the fifth hierarchical level is generated by averaging data $x_4(0)$ to $x_4(3)$ of the fourth hierarchical level. The block size of the fifth hierarchical level is (1/16×1/16).

Figure 13:
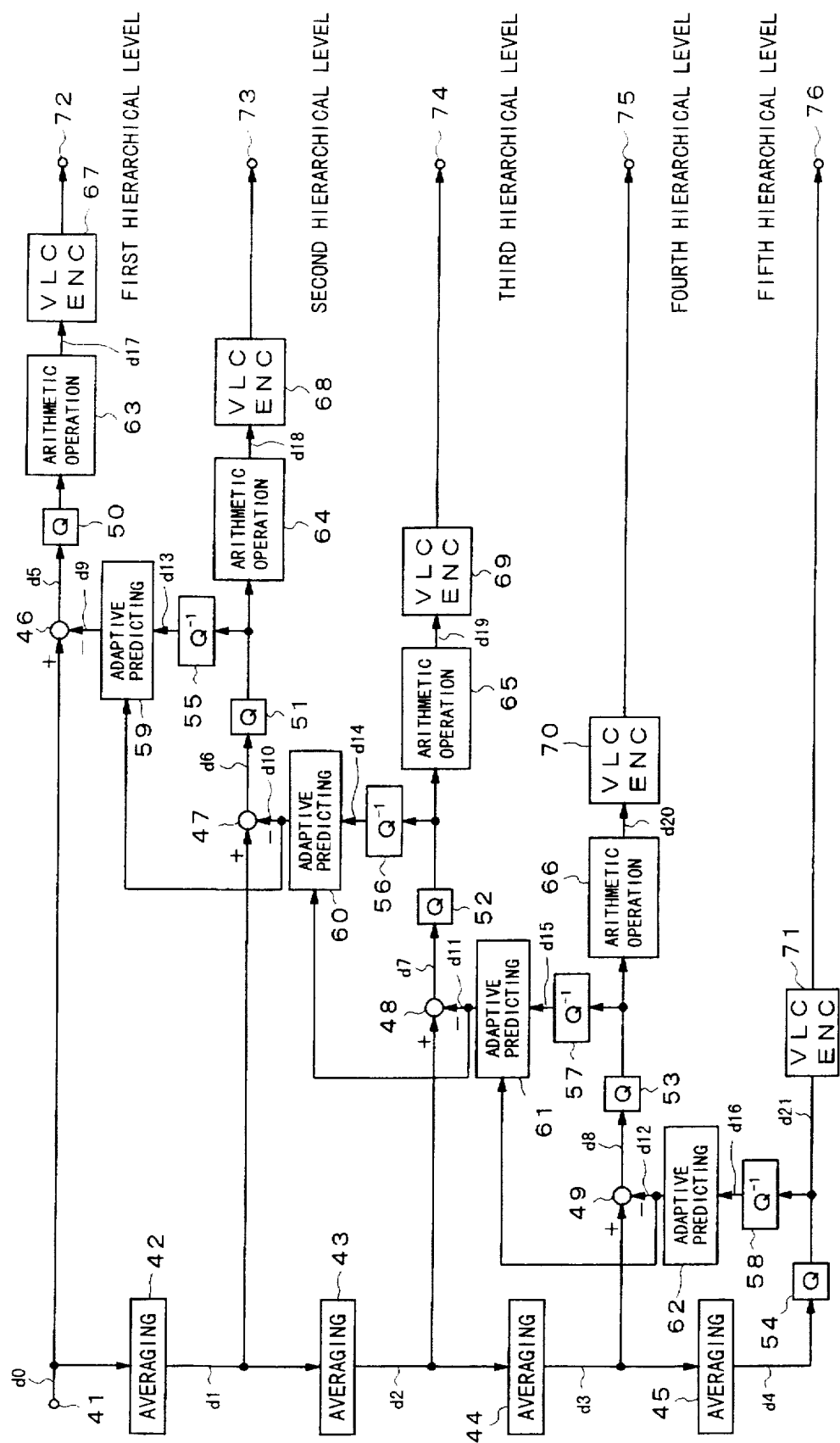
FIG. 13 is a block diagram showing an example of the structure of an encoding side performing the hierarchical encoding process according to a second embodiment of the present invention.

With hierarchically structured data that prevents the number of pixels to be encoded from increasing, by applying the class category adaptive predicting process for data of a higher hierarchical level, data of a lower hierarchical level is predicted and the difference (namely, the difference signals) between the data of the lower hierarchical level and the predicted values. Thus, the amount of data to be transmitted can be decreased. FIG. 13 shows the structure of an encoding unit that performs such a process. First hierarchical level data d0 as input picture data d0 is supplied from an input terminal 41 to an average calculating circuit 42 and a subtracting unit 46. The first hierarchical level data is picture data with the original resolution.

The average value calculating circuit 42 performs the ¼ average value calculating process for the input picture data d0 and generates hierarchical data d1. The hierarchical data d1 corresponds to the second hierarchical level data shown in FIG. 12. The generated hierarchical data d1 is supplied to an average value calculating circuit 43 and a subtracting unit 47.

The average calculating circuit 43 performs the same process as the average value calculating circuit 42 for the hierarchical data d1 and generates hierarchical data d2. The hierarchical data d2 corresponds to the third hierarchical level data. The generated hierarchical data d2 is supplied to an average value calculating circuit 44 and a subtracting unit 48. Likewise, the average value calculating circuit 44 performs the ¼ average value calculating process for the hierarchical data d2 and generates hierarchical data d3. The hierarchical data d3 corresponds to the fourth hierarchical level data. The generated hierarchical data d3 is supplied to an average value calculating circuit 45 and a subtracting unit 49. Likewise, the averaging circuit 45 performs the ¼ average value calculating process for the hierarchical data d3 and generates hierarchical data d4. The hierarchical data d4 corresponds to the fifth hierarchical level data. The generated hierarchical data d4 is supplied to a quantizing unit 54.

Hierarchical data of these five hierarchical levels is predicted between hierarchical levels. The quantizing process for compressing data in the fifth hierarchical level is performed by the quantizing unit 54. Output data d21 of the quantizing unit 54 is supplied to a variable-length-code encoder 71 and a dequantizing unit 58. The output data of the encoder 71 is obtained as fifth hierarchical level data from an output terminal 76. Output data d16 of the dequantizing unit 58 is supplied to a class category adaptive predicting circuit 62.

The class category adaptive predicting circuit 62 performs the predicting process with the data d16 and generates a predicted value d12 of the fourth hierarchical level data. The predicted value d12 is supplied to a subtracting unit 49. The subtracting unit 49 obtains the difference value between the hierarchical data d3 supplied from the average value calculating circuit 44 and the predicted value d12 and supplies the obtained difference value d8 to a quantizing unit 53.

As with the quantizing unit 54, the quantizing unit 53 requantizes the difference value d8 in such a manner that the number of quantizing bits decreases. The output data of the quantizing unit 53 is supplied to a calculating unit 66 and a dequantizing unit 57. The calculating unit 66 performs the thin-out process for thinning out one of four pixels and supplies data d20 to a variable-length-code encoder 70. The variable-length-code encoder 70 encodes the data d20. The output data of the encoder 70 is obtained as fourth hierarchical level data from an output terminal 75.

The fourth hierarchical level data d12 predicted by the class category adaptive predicting circuit 62 and the output data (decoded difference signal) d15 of the dequantizing unit 57 are supplied to a class category adaptive predicting circuit 61. The class category adaptive predicting circuit 61 adds the data d12 and the data d15, forms locally decoded data of the fourth hierarchical level, performs the predicting process with the locally decoded data, generates a predicted value d11 of the third hierarchical level data, and supplies the predicted value d11 to a subtracting unit 48. The subtracting unit 48 obtains the difference value between the data d2 supplied from the average value calculating circuit 43 and the predicted value d11 and supplies the difference value d7 to a quantizing unit 52.

The output data of the quantizing unit 52 is supplied to a calculating unit 65 and a dequantizing unit 56. The calculating unit 65 performs the thin-out process for thinning out one of four pixels and supplies third hierarchical level data d19 to a variable-length-code encoder 69. Output data of the encoder 69 is obtained as third hierarchical level data from an output terminal 74.

The third hierarchical level data d11 predicted by the class category adaptive predicting circuit 61 and output data d14 of the dequantizing unit 56 are supplied to a class category adaptive predicting circuit 60. The class category adaptive predicting circuit 60 adds the data d11 and the data d14, forms locally decoded data of the third hierarchical level, performs the predicting process with the locally decoded data, generates a predicted value d10 of the second hierarchical level, and supplies the predicted value d10 to the subtracting unit 47. The subtracting unit 47 obtains the difference value between the data d1 supplied from the average value calculating circuit 42 and the predicted value d10 and supplies the difference value d6 to a quantizing unit 51.

The output data of the quantizing unit 51 is supplied to a calculating unit 64 and a dequantizing unit 55. The calculating unit 64 performs the thin-out process for thinning out one of four pixels and supplies second hierarchical level data d18 to a variable-length-code encoder 68. The output data of the encoder 68 is obtained as second hierarchical level data from an output terminal 73.

The second hierarchical level data d10 predicted by the class category adaptive predicting circuit 60 and output data d13 of the dequantizing unit 55 are supplied to a class category adaptive predicting circuit 59. The class category adaptive predicting circuit 59 adds the data d10 and the data d13, forms locally decoded data of the second hierarchical level, performs the predicting process with the locally decoded data, generates a predicted value d9 of the first hierarchical level, and supplies the predicted value d9 to the subtracting unit 46. The subtracting unit 46 obtains the difference value between the input picture data d0 supplied from the input terminal 41 and the predicted value d9 and supplies the difference value d5 to a quantizing unit 50.

The output data of the quantizing unit 50 is supplied to a calculating unit 63. The calculating unit 63 performs the thin-out process for thinning out one of four pixels and supplies first hierarchical level data d17 to a variable-length-length code encoder 67. The output data of the encoder 67 is obtained as first hierarchical level data from an output terminal 72.

The class category adaptive predicting circuits 59, 60, 61, and 62 predict pixels of lower hierarchical levels corresponding to distributions of levels of a plurality of pixels spatially adjacent thereto (included in the higher hierarchical levels). Since the structure of these class category adaptive predicting circuits is the same as the structure shown in FIG. 7, the description is omitted for simplicity.

The same structure as the encoding unit 125 (see FIG. 2) according to the above-described embodiment is also disposed on the hierarchical-code encoder side. Each of the quantizing units 50, 51, 52, 53, and 54 has the same structure as the quantizing units 125.

Figure 14:
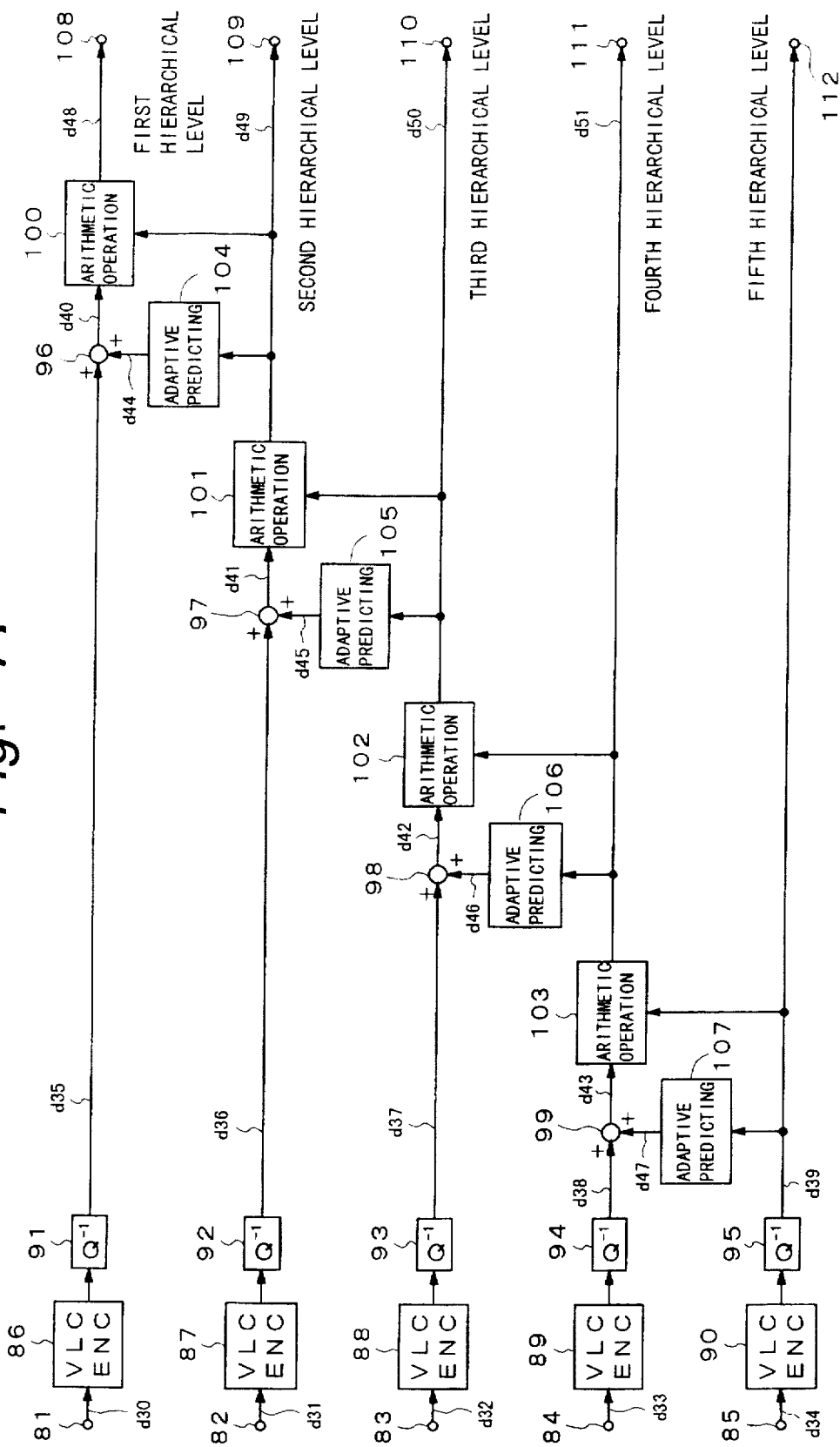
FIG. 14 is a block diagram showing an example of the decoding side according to the second embodiment of the present invention.

FIG. 14 shows an example of the structure of the hierarchical-code decoder side corresponding to the above-described encoder. Data of each hierarchical level generated on the encoder side is supplied as d30 to d34 to input terminals 81, 82, 83, 84, and 85, respectively. Variable-length-code decoders 86, 87, 88, 89, and 90 perform the variable-length-code decoding process for the hierarchical data d30 to d34, respectively. The variable-length-code decoders 86, 87, 88, 89, and 90 are connected to dequantizing units 91, 92, 93, 94, and 95, respectively.

The dequantizing unit 95 dequantizes the fifth hierarchical level input data d34 and supplies picture data d39 to a class category adaptive predicting circuit 107 and a calculating unit 103. The picture data d39 is obtained as picture output data of the fifth hierarchical level from an output terminal 112.

The class category adaptive predicting circuit 107 performs the class category adaptive predicting process for picture data of the fourth hierarchical level and generates a predicted value d47 of the fourth hierarchical level data. Data d38 (namely, a difference value) supplied from the dequantizing unit 94 and the predicted value d47 are added by an adding unit 99. Picture data d43 is supplied from the adding unit 99 to a calculating unit 103. The calculating unit 103 performs the above-described calculation for obtaining the value of each pixel that was not transmitted. With the picture data d39 supplied from the dequantizing unit 95 and the picture data d43, the calculating unit 103 restores all pixel values of the fourth hierarchical level. All the pixel values restored by the calculating unit 103 are supplied as picture data d51 to a class category adaptive predicting circuit 106 and a calculating unit 102. In addition, the picture data d51 is obtained as output data of the fourth hierarchical level from an output terminal 111.

The class category adaptive predicting circuit 106 performs the class category adaptive predicting process for picture data of the third hierarchical level and generates a predicted value d46 of the third hierarchical level data. Data d37 supplied from the dequantizing unit 93 and the predicted value d46 are added by an adding unit 98. The adding unit 98 supplies picture data d42 to the calculating unit 102. The calculating unit 102 obtains the value of each pixel that was not transmitted. With the picture data d51 supplied from the calculating portion 103 and the picture data d42, the calculating unit 102 restores all pixel values of the third hierarchical level. All the pixel values restored by the calculating portion 102 is supplied as picture data d50 to a class category adaptive predicting circuit 105 and a calculating portion 101. In addition, the picture data d50 is obtained as output data of the third hierarchical level from an output terminal 110.

The class category adaptive predicting circuit 105 performs the class category adaptive predicting process for picture data of the second hierarchical level and generates a predicted value d45 of the second hierarchical level data. Data d36 supplied from the dequantizing unit 92 and the predicted value d45 are added by an adding unit 97. The adding unit 97 supplies picture data d41 to the calculating unit 101. The calculating unit 101 obtains the value of each pixel that was not transmitted. With the picture data d50 supplied from the calculating unit 102 and the picture data d41, the calculating unit 101 restores all pixel values of the second hierarchical level. All the pixel values restored by the calculating unit 101 are supplied as picture data d49 to a class category adaptive predicting circuit 104 and a calculating unit 100. In addition, the picture data d49 is obtained as output data of the second hierarchical level from an output terminal 109.

The class category adaptive predicting circuit 104 performs the class adaptive predicting process for picture data of the first hierarchical level and generates a predicted value d44 of the first hierarchical level data. Data d35 supplied from the dequantizing unit 91 and the predicted value 44 are added by an adding unit 96. The adding unit 96 supplies picture data d40 to the calculating unit 100. The calculating unit 100 obtains the value of each pixel that was not transmitted. With the picture data d49 supplied from the calculating unit 101 and the picture data d40, the calculating unit 100 restores all pixel values of the first hierarchical level. All the pixel values as picture data d48 restored by the calculating unit 100 are obtained as output data of the first hierarchical level from an output terminal 108. Each of the class category adaptive predicting circuits 104, 105, 106, and 107 has the above-described practical structure as shown in FIG. 7.

Each of the dequantizing units 91, 92, 93, 94, and 95 has the same structure as the decoding unit 134 according to the above-described embodiment. Thus, as with the above-described first embodiment, in the second embodiment of which the present invention is applied for the above-described hierarchical-code encoding process, since it is not necessary to transmit the zero position flag ZR and the quantizing step Δ, the amount of data can be further decreased.

According to the present invention, in the encoding process (or decoding process) of which the number of bits of codes of quantized values generated in the requantizing process is reduced, the amount of data (ZR and Δ) to be transmitted can be remarkably reduced. Thus, the amount of data transmitted can be further reduced.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. An information signal encoding apparatus for encoding an input digital information signal in such a manner that the amount of data generated decreases, the apparatus comprising:

means for generating difference signals representing differences between sample values of the input digital information signal;

means for block segmenting the difference signals;

means for detecting the maximum value and minimum value of each block and generating a quantizing step and a zero position flag by the maximum value and the minimum value, the zero position flag representing a code of quantized output data that includes 0;

predicting means for generating a predicted value of the quantizing step and a predicted value of the zero position flag;

quantizing means for requantizing the block-segmented difference signals by the quantizing step and the predicted value of the zero position flag; and transmitting means for transmitting the quantized output data.

2. The information signal encoding apparatus as set forth in claim 1, wherein said predicting means is adapted for performing an exception process for supplying the zero position flag and the quantizing step obtained by the maximum value and the minimum value to said quantizing means and transmitting the zero position flag and the quantizing step to the outside of the apparatus when a zero position flag and a quantizing flag are not present on the periphery of a block to be predicted.

3. The information signal encoding apparatus as set forth in claim 1,
wherein said predicting means comprises:
first class category adaptive predicting means for categorizing a class by a zero position flag of a block adjacent to a block to be predicted and linear combining the zero position flag of the block adjacent to the block to be prediced and a coefficient pre-learnt for each class so as to generate a predicted value of the zero position flag; and
second class category adaptive predicting means for categorizing a class by a quantizing step of a block adjacent to a block to be prediced and linear combining the quantizing step of the block adjacent to the block to be prediced and a coefficient pre-learnt for each class so as to generate a predicted value of the quantizing step.

4. The information signal encoding apparatus as set forth in claim 1,
wherein said predicting means comprises:
first class category adaptive predicting means for categorizing a class by a zero position flag of a block adjacent to a block to be prediced so as to generate a predicted value of the zero position flag pre-learnt for each class; and
second class category adaptive predicting means for categorizing a class by a quantizing step of a block adjacent to a block to be prediced so as to generate a predicted value of the quantizing step pre-learnt for each class.

5. An information signal encoding method for encoding an input digital information signal in such a manner that the amount of data generated decreases, the method comprising the steps of:
generating difference signals representing differences between sample values of the input digital information signal;
block segmenting the difference signals;
detecting the maximum value and minimum value of each block and generating a quantizing step and a zero position flag by the maximum value and the minimum value, the zero position flag representing a code of quantized output data that includes 0;
generating a predicted value of the quantizing step and a predicted value of the zero position flag;
requantizing the block-segmented difference signals by the quantizing step and the predicted value of the zero position flag; and
transmitting the quantized output data.

6. An information signal encoding apparatus for generating at least first hierarchical data and second hierarchical data by an input digital information signal, encoding the first hierarchical data and the second hierarchical data, and transmitting the encoded data, the apparatus comprising:
means for forming the second hierarchical data with a resolution lower than the first hierarchical data;
means for predicting the first hierarchical data by the second hierarchical data;

means for forming difference signals representing differences between the predicted data and the first hierarchical data;
means for block segmenting the difference signals;
means for detecting the maximum value and minimum value of each block and generating a quantizing step and a zero position flag by the maximum value and the minimum value, the zero position flag representing a code of quantized output data that includes 0;
predicting means for generating a predicted value of the quantizing step and a predicted value of the zero position flag;
quantizing means for requantizing the block-segmented difference signals by the quantizing step and the predicted value of the zero position flag; and
transmitting means for transmitting the quantized output data.

7. An information signal encoding method for generating at least first hierarchical data and second hierarchical data by an input digital information signal, encoding the first hierarchical data and the second hierarchical data, and transmitting the encoded data, the method comprising the steps of:
forming the second hierarchical data with a resolution lower than the first hierarchical data;
predicting the first hierarchical data by the second hierarchical data;
forming difference signals representing differences between the predicted data and the first hierarchical data;
block segmenting the difference signals;
detecting the maximum value and minimum value of each block and generating a quantizing step and a zero position flag by the maximum value and the minimum value, the zero position flag representing a code of quantized output data that includes 0;
generating a predicted value of the quantizing step and a predicted value of the zero position flag;
requantizing the block-segmented difference signals by the quantizing step and the predicted value of the zero position flag; and
transmitting the quantized output data.

8. A picture record medium for recording a signal of which an input digital information signal has been encoded in such a manner that the amount of data generated decreases, the picture record medium having a record region for recording the encoded signal, the encoded signal being generated by an information signal encoding apparatus, the information signal encoding apparatus comprising:
means for generating difference signals representing differences between sample values of the input digital information signal;
means for block segmenting the difference signals;
means for detecting the maximum value and minimum value of each block and generating a quantizing step and a zero position flag by the maximum value and the minimum value, the zero position flag representing a code of quantized output data that includes 0;
predicting means for generating a predicted value of the quantizing step and a predicted value of the zero position flag; and
quantizing means for requantizing the block-segmented difference signals by the quantizing step and the predicted value of the zero position flag.

* * * * *